Oct. 23, 1962     W. FROEDE ET AL     3,059,585
BUILT-UP ROTORS FOR ROTARY ENGINES
Filed April 4, 1960     2 Sheets-Sheet 1
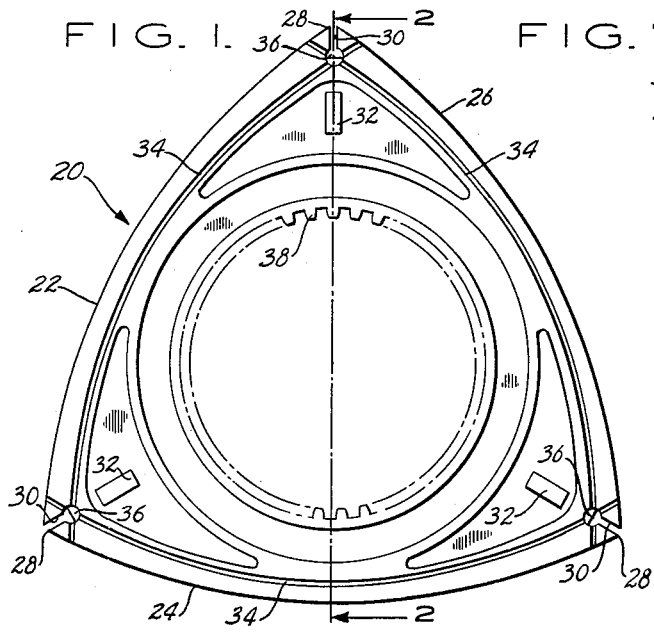
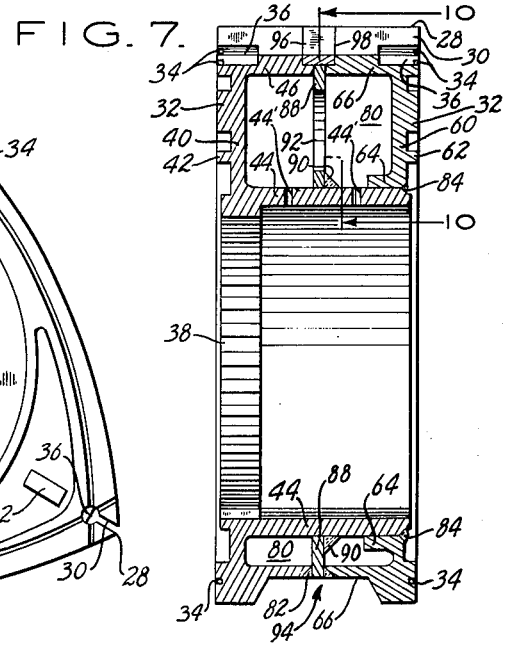
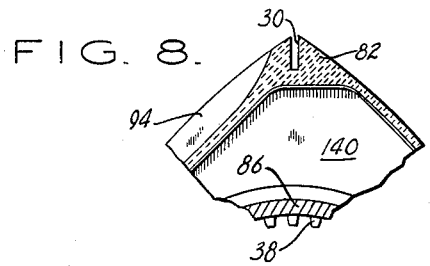
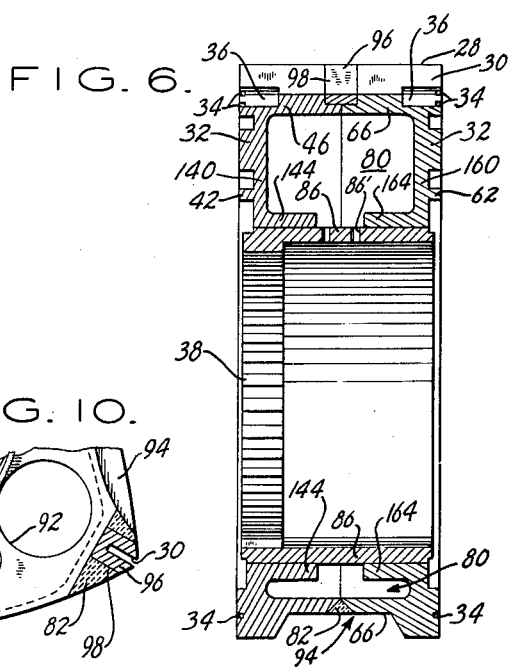
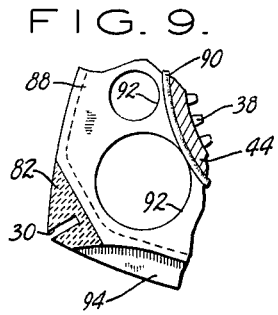
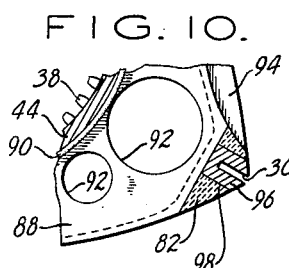
INVENTORS
WALTER FROEDE
HANNS-DIETER PASCHKE
BY
*Morgan, Finnegan, Durham & Pine*
ATTORNEYS Oct. 23, 1962     W. FROEDE ET AL     3,059,585
BUILT-UP ROTORS FOR ROTARY ENGINES Filed April 4, 1960     2 Sheets-Sheet 2

INVENTORS
WALTER FROEDE
HANNS-DIETER PASCHKE
BY
*Morgan, Finnegan, Durham & Pine*
ATTORNEYS United States Patent Office 3,059,585
Patented Oct. 23, 1962

3,059,585
BUILT-UP ROTORS FOR ROTARY ENGINES
Walter Froede and Hanns-Dieter Paschke, Neckarsulm, Germany, assignors to NSU Motorenwerke Aktiengesellschaft, Neckarsulm, and Wankel G.m.b.H., Lindau (Bodensee), Germany
Filed Apr. 4, 1960, Ser. No. 19,908
Claims priority, application Germany Apr. 23, 1959
16 Claims. (Cl. 103—130)

This invention relates to rotary engines and especially rotary engines of the type in which an inner body, hereinafter termed a rotor, performs a rotary or planetary rotary movement within a hollow outer body which may be stationary or rotary, thereby to form variable volume working chambers. Rotary engines of this types are especially useful as compressors, pumps, and internal combustion engines. More particularly, this invention relates to rotors for such engines and to methods of manufacturing such rotors.

These internal combustion engines, compressors and rotary pumps generally comprise a rotary or stationary outer body having axially spaced end walls and a peripheral wall connecting the end walls. The peripheral wall generally includes at least two symmetrically arranged circumferentially spaced lobe-defining portions on its inner surface with the rotor eccentrically supported within the outer body between these walls. The rotor includes radially extending end faces spaced axially of the rotor axis and connected by a peripheral outer surface. At least three symmetrically arranged circumferentially spaced apex portions are provided on its peripheral outer surface with the edges of the apex portions being parallel to the axis of the rotor and in continuous sliding contact or engagement with the inner peripheral wall of the housing.

Each apex portion of the rotor is provided with an axially-extending groove for the reception in each of a sealing strip or peripheral seal. The radially-extending end faces of the rotor are provided with end face seals or sealing elements in continuous engagement with the axially spaced end walls. The outer body also includes an intake port or ports in one of or in both of the end walls and, if desired, in the peripheral wall, and an exhaust port in the peripheral wall. The improved rotors of the present invention are particularly useful in engines of the type described heretofore.

One of the problems in connection with rotors of the type used in such rotary engines is that they have to be made hollow for the sake of saving in weight and for the obtainment of cooling. It is also necessary to provide gearing between the rotor and the outer body in order to maintain a desired relative movement therebetween, which gearing may generally consist of an internally toothed wheel or internal ring gear fixed to the rotor, and an externally toothed wheel or sun gear fixed to the outer body.

It is also known that if the rotary engine is used as an internal combustion engine the rotor will be subject to considerable gas pressure generated within the working chambers. This problem of the gas pressure dictates that the rotor be of adequate structural strength, hence of a mass or weight adequate therefor, while the cooling required dictates that the rotor be made with the largest possible heat dissipation surface internally.

It is therefore an object of this invention to provide a rotor which is hollow for the sake of cooling and weight-saving, and yet is economical to manufacture, especially in steel.

A further object of the invention is to provide a new and improved rotor which has a hollow interior so as to obtain low weight and a large heat dissipation surface area for cooling and yet has adequate structural strength.

Another object of this invention is to provide for such engines a built-up hollow rotor so as to enable its manufacture by drop forging if made of steel and to simplify the mold or die employed if light alloys be used as the construction material.

Yet another object is to provide for a method of manufacturing a rotor with the foregoing features which is simple and employs readily available techniques and manufacturing devices.

A still further object of the present invention is the provision of an improved rotor for rotary engines of the above character which is of simple design and construction, economical to manufacture and highly efficient in the accomplishment of its intended purpose.

In order to accomplish the foregoing objects, the rotor is composed of two basic parts each of which is concentric with the axis of rotation of the rotor and includes a full circumferential portion of the outer peripheral surface of the rotor. These two basic parts are disposed with their respective circumferential surface portions at opposite sides of a plane of division perpendicular to the axis of rotation of the rotor and are securely joined together with their opposing peripheral edges in preferably fluid-tight relationship. Preferably, the plane of division is the central plane of the rotor. Preferably also, the two parts of the rotor are joined together integrally along their abutting peripheral edges, as by welding, although they may be joined together separably with their opposing edges in fluid-tight relation, by means of bolts or other suitable securing means. The built-up or sectional construction according to the present invention thus enables the manufacturing of the rotor to be carried out by drop forging. Where the rotor is made from light alloys, the mold or die is considerably simplified. Advantageously, the internal toothed wheel can be manufactured as part of the rotor hub portion which latter may be integral with one of the rotor parts.

As a modification and to reduce the costs involved, the two basic parts of the rotor may be made identical, and a separate hub portion carrying on one surface, the inner peripheral surface thereof, the internal toothed wheel, may be provided. The other or outer peripheral surface of the hub portion may be press-fitted within the identical parts of the rotor or welded thereto or coupled thereto by any suitable means to provide a unitary structure composed of the two identical parts, the hub portion and the internal toothed wheel.

A further feature of the present invention is the provision of an insert sheet or reinforcing member in the plane of division between the two peripherally welded rotor parts, to take care of the bending stress exerted upon the peripheral welding seam by the high gas pressures acting on the welding seam in the rotor when used in an internal combustion engine. The insert sheet is provided in the plane of division perpendicular to the axis of rotation of the rotor in abutting relationship with the portion thereof acting as the hub portion, and may be connected to the rotor parts by the peripheral welding and, if desired, welded to the rotor hub. As an alternative, the insert sheet may be welded to the rotor parts and press-fitted onto the hub portion.

As mentioned heretofore, the axis-parallel apex portions of the rotor are provided with axially extending grooves for the reception of the radially-extending peripheral sealing strips. These grooves penetrate the plane of division of the rotor and in order to obtain an effective and reliable tightness of the bottom of the grooves in the plane of division of the rotor parts, the radial thickness or depth of the welding seam in the apex portion is, preferably, made larger than the depth of the apex grooves in the apex portions. In this instance, the grooves are completely within the welding seam in the region of the plane of division.

In certain cases it is both desirable and necessary for the apex groove not to extend through the material of the peripheral welding seam. In order to accomplish this, an apex insert may be fitted at the apex edges in the plane of division of the rotor parts in order to bridge the welding seam, with the apex grooves penetrating and traversing the apex insert members to provide a continuous groove for the apex sealing strips. The last-mentioned inserts are closely fitted within suitable, radially-extending bores formed in the plane of division of the rotor parts and are fixedly connected to the two basic rotor parts, preferably by gas-shielded brazing and alternatively by welding or other suitable means. The walls of the apex grooves are thus formed solely from the material of the rotor parts and of the apex inserts. Preferably, the apex inserts are cylindrically shaped and form a close fit with the rotor parts when inserted in suitable radial bores in the plane of division of the rotor.

It will also be evident that the rotor may be held stationary and the housing rotated with respect thereto without changing the effective function of the rotor and the use thereof.

It is still another object of this invention to provide a built-up rotor for rotary engines.

The objects, advantages and nature of the invention will be more fully understood from the following description of the preferred embodiments of the invention, shown, by way of example, in the accompanying drawings, in which:

FIG. 1 is a top plan view, partially diagrammatic, of a sectional or built-up rotor in accordance with this invention for a rotary internal combustion engine of the type aforesaid, the outer body of the internal combustion engine as well as the apex and end face seals of the rotor being omitted for the sake of clarity;

Figure 2:
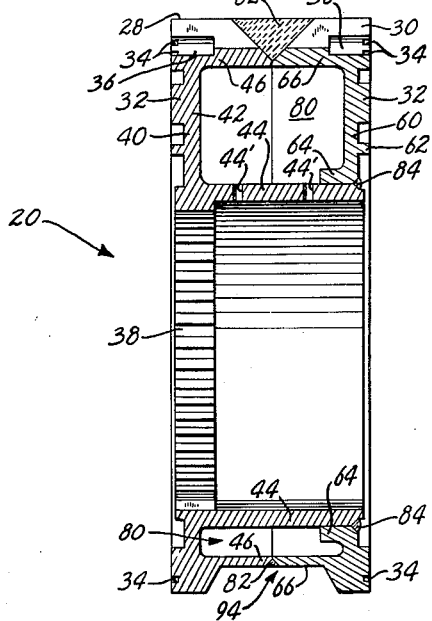
FIG. 2 is a vertical sectional view taken along line 2—2 of FIG. 1 illustrating a two-part rotor in which the rotor hub is integral with one of the rotor parts.
Figure 4:
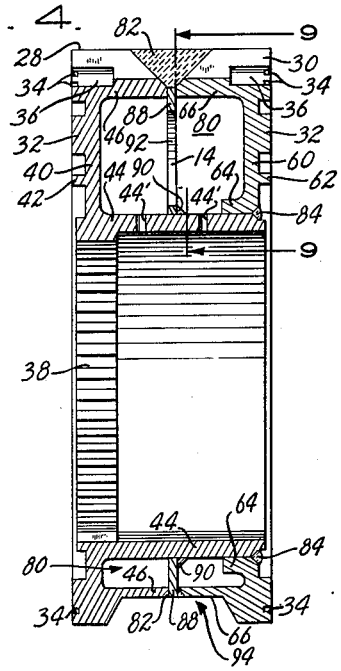
Figure 3:
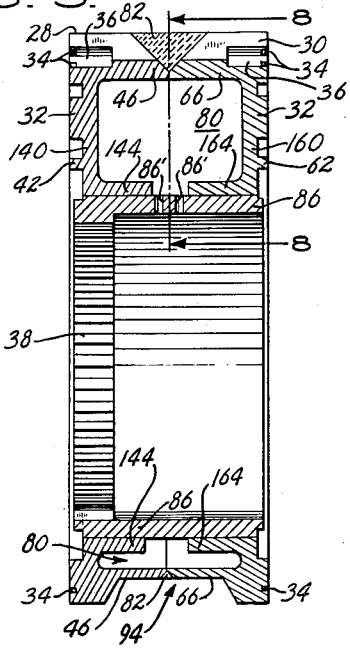
FIG. 3 is a modification of the embodiment shown in FIG. 2 and is a vertical sectional view along a plane corresponding to that off FIG. 2, illustrating a two-part rotor formed of identical rotor portions coupled to a separate hub portion.
Figure 5:
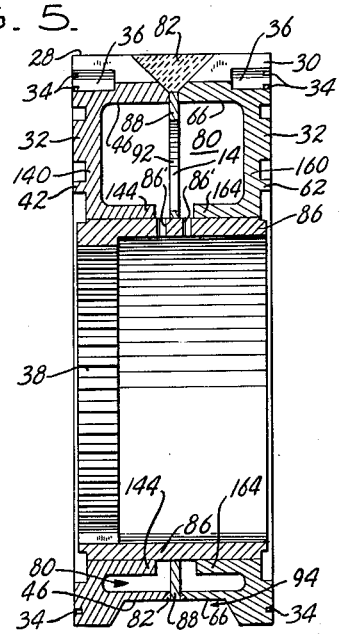

FIGS. 4 and 5 are modifications of the embodiments shown in FIGS. 2 and 3, respectively, and each is a vertical sectional view along a plane corresponding to the section planes of FIGS. 2 and 3, illustrating rotors corresponding to those of FIGS. 2 and 3 but with an insert sheet or reinforcing member positioned in the plane of division between the two rotor parts;

FIGS. 6 and 7 are modifications of the embodiments shown in FIGS. 3 and 4, respectively, and each is a vertical sectional view along a plane corresponding to the section planes of FIGS. 3 and 4, illustrating an apex insert in the plane of division between the two basic rotor parts, at the apex thereof;

FIG. 8 is a fragmentary part-sectional view taken along line 8—8 of FIG. 3;

FIG. 9 is a fragmentary part-sectional view taken along line 9—9 of FIG. 4; and

FIG. 10 is a fragmentary part-sectional view taken along line 10—10 of FIG. 7.

In the drawings which illustrate the best modes now contemplated for carrying out the invention, similar characters of reference indicate corresponding parts in all of the figures.

Referring now more particularly to FIG. 1, a rotor generally designated 20 is shown removed from its associated shaft which normally rotatably couples it to the surrounding outer body of a rotary engine (not shown). For the sake of explanation only, it is to be understood that the surrounding outer body (not shown) has an inner peripheral surface preferably in the form of a two-lobed epitrochoid. The peripheral contour of rotor 20 is of a configuration operably conforming to the shape of the inner peripheral surface of the outer body, and, as shown, each of the rotor peripheral sides 22, 24 and 26 is shaped to form, with the other two sides, an equilateral triangle having correspondingly arched sides. At each of the apex edges 28 defined by the intersection of each two curved sides 22—24, 24—26 and 22—26, there is provided an axially-extending groove 30 which extends in a direction perpendicular to the plane of the drawing in FIG. 1 and parallel to the rotational axis of rotor 20. Sealing strips or apex seals (not shown) are adapted to be inserted into each of grooves 30 to provide an effective apex or peripheral seal between rotor 20 at the apex edges 28 thereof and the inner peripheral surface of surrounding outer body of the engine (not shown).

Each end face of the rotor 20 is provided with end face seals or sealing elements (not shown) to provide a seal between each end face of the rotor and the opposing end wall of the surrounding outer body of the engine. The respective end face seals are individually, flexibly, sealingly coupled to the respective end faces of the rotor by means of thin metal sealing strips (not shown). Dogs or drive members 32 at each end face of the rotor 20, to be further described hereinafter, cooperate to couple the two end face seals of the rotor to the rotor for driving of the end seals by and with the rotor. The thin metal sealing strips which connect the end seals in an axially movable manner to the rotor are adapted to be inserted into the narrow grooves 34. Near each of the apices (apex edges) 28 of the rotor, there is provided a suitable axially-extending opening or hole 36 for the reception of suitable intermediate sealing members (not shown) to provide a continuous outer portion of gapless connection between the axially-extending apex sealing strips and the end face sealing strips. While the sealing strips and sealing elements as such form no part of the present invention as such, provision is made in the rotor 20 for their reception since it is necessary to provide the rotor with sealing means which seal the rotor in an axial as well as a radial direction against the surrounding housing. Hence, the axially-extending apex sealing strips are arranged within longitudinal grooves 30 in the direction parallel to the axis of the rotor and cooperate with the end face sealing strips.

Rotor 20 is provided with an internal toothed wheel or ring gear 38 which may be coupled to or in mesh with a complementary gear (not shown) provided in the outer body of the engine and affixed thereto to maintain a certain relative rotary or planetary rotary movement between the rotor 20 and the outer body.

In FIGS. 2 to 7 various modifications of rotor 20 are shown in which the rotor has a hollow interior of varying cross-sectional area and, in FIGS. 2, 4 and 7, is constructed of two basic parts or portions 40 and 60 integrally joined together peripherally along a central plane of division which is perpendicular to the axis of rotation of the rotor. Rotor parts 40 and 60 are joined to each other at their opposing peripheral edges by welding, brazing or other suitable means. A suitable finishing process is also employed after parts 40 and 60 are fixed to each other. As mentioned heretofore, the rotor, and particularly, the rotor parts 40 and 60 when coupled together form a hollow chamber 80 of varying cross-sectional area to provide for the necessary internal cooling and siutable weight (or mass) reduction requirements, thereby enabling the use of steel or other suitable metal or metal alloy to fabricate the rotor parts. Moreover, the rotor, and particularly the parts 40 and 60 may be manufactured by drop forging. On the other hand, if the rotor and the parts 40 and 60 are to be fabricated from light alloys, the mold or die to be used is considerably simplified.

Referring now more particularly to FIG. 2, the hollow rotor 20 comprises the individual rotor parts 40 and 60 which, circumferentially, are of arched triangular shape and of a generally U-shaped or channel-shaped configuration in section in planes of the rotational axis. Together they form a hollow rotor structure of generally box section, having ample structural rigidity. Part 40 which forms one part of the rotor structure comprises a base or end face portion 42, an inner leg or hub portion 44 and an outer leg or peripheral portion 46, the leg portions being of unequal lengths axially of the rotor. Inner leg portion 44 is substantially cylindrically shaped and, in addition to forming a hub portion also carries the ring gear 38. Part 60 which forms another part of the rotor structure similarly comprises a base or end face portion 62, an inner leg portion 64 and an outer leg or peripheral portion 66, the leg portions 64 and 66 being of unequal length axially of the rotor. Inner leg portion 64, like inner leg portion 44, is also cylindrically shaped, and the outer leg or peripheral portions 46 and 66 of the parts 40 and 60, respectively, have an outer configuration of an arched-triangular shape.

In this embodiment, the outer leg or peripheral portions 46 and 66 are of substantially equal length axially of the rotor, and the inner leg or hub portion 44 has a greater length than the inner leg portion 64, axially of the rotor. The leg portion 44, in addition to functioning as the hub of the rotor, is snugly telescopically received within the leg portion 64 and extends axially substantially the full length of the inner leg portion 64. The outer leg or peripheral portions 46 and 66 are of equal length axially of the rotor.

Parts 40 and 60 are fixedly connected to each other preferably by welding or other suitable equivalent method such as, for example, brazing, at the junction between the opposing peripheral edges of outer leg portions 46 and 66, as indicated by the peripheral welding seam 82, and at the junction between the inner peripheral surface of leg portion 44 and the outer peripheral surface of leg portion 64, as indicated by the circumferential welding seam 84. At the top of FIG. 2 which illustrates the connection at one of the apex grooves 30, the welding seam 82 is shown as being deeper than the groove 30 in the plane of division between parts 40 and 60; and, it is clear that the apex groove extends through the joining material at the junction so that the bottom of the groove is sealed tight by this material where it crosses this plane of division.

Parts 40 and 60 may be drop forgings formed by any well known suitable drop forging method, and while it is preferred to fabricate the rotor of steel, it is to be understood that light-weight alloys and other suitable materials may also be used and these parts formed by molding or die-casting. It is not necessary to provide a highly finished and polished surface since the peripheral seals and the end face seals provide the surface contact between the rotor and the peripheral and side walls, respectively, of the engine outer body. The two parts 40 and 60 are forged or otherwise suitably formed with the component parts thereof described hereinbefore, and the internally toothed gear 38 may also be formed as a unit with one of the parts, part 40 for example, as shown in FIGS. 2, 4 and 7. While a connection is shown at junction 84, this is desirable, although not imperative, to ensure that inner leg portion 64, during operation and use of the rotor, is not separated from hub portion 44.

Referring now more particularly to FIGS. 3 and 8, in which corresponding parts are indicated by the same characters of reference and similar parts are indicated by the same reference numerals, with the addition of 100, as in FIG. 2, parts 140 and 160 are made identical so that the same forging, die-casting or molding may be used for part 140 as for part 160. Inner leg portions 144 and 164 which are identical have a smaller axial length than the outer leg portions 46 and 66, respectively. In this embodiment, inner leg portion 144, and similarly inner leg portion 164, does not act as the hub for the rotor. A separate hub portion 86 is provided. The outer peripheral surface of the separate hub portion 86 is in mating face-to-face relationship with the outer peripheral surfaces of inner leg portions 144 and 164, and the other or inner peripheral surface of hub portion 86 carries the internally toothed wheel or ring gear 38. Hub portion 86 may be fabricated in a manner similar to portions 140 and 160.

While peripheral portions 46 and 66 are connected together peripherally in the same manner as the corresponding portions 46 and 66 of FIG. 2, along a plane perpendicular to the rotational axis of the rotor, the inner leg portions 144 and 164 may be welded or otherwise integrally joined to the hub 86, or press-fitted onto the outer peripheral surface thereof, or coupled thereto by any suitable means. It will be evident that the basic rotor parts 140 and 160, together with hub portion 86, form a unitary structure.

Referring now more particularly to FIGS. 4, 5 and 9, these illustrate individual rotors generally similar to the rotors of FIGS. 2 and 3, respectively, the corresponding parts being indicated by the same reference characters. With reference to FIG. 4, a generally annularly-shaped insert sheet or reinforcing member 88 is provided along the plane of division between parts 40 and 60. The insert sheet, at its outer circumferential margin, is abutted by the opposing edges of peripheral portions 46 and 66 and at its inner circumferential perimeter abuts the inner peripheral surface of the hub portion 44 (FIG. 4) in a direction normal thereto. Peripheral portions 46 and 66 are fixedly connected to insert sheet 88 circumferentially thereof by means of the peripheral weld or seam 82. As noted above if the rotor is used in a rotary internal combustion engine, considerable gas pressure arises within the working chambers and this gas pressure acts on the weld seam and exerts a bending stress. The insert sheet serves to minimize deflection from this stress or to avoid it completely, since the bending stresses are taken up by the insert sheet. In order to provide further strength along the joint between insert sheet 88 and inner leg portion 44, an additional welded joint is provided at 90, this joint extending circumferentially about leg portion 44. In order further to reduce the weight of the rotor structure and to enable circulation of cooling liquid in the hollow interior 80 of the rotor, insert sheet 88 is provided with one or more spaced openings 92, FIG. 9, interconnecting both portions of the hollow chamber 80.

Turning now more specifically to FIG. 5, it will be noted that insert sheet 88 is connected with the separate hub portion 86 and is connected thereto in a manner similar to the connection between hub portion 86 and leg portions 144 and 164, that is, by welding, press-fitting, or other suitable method. As illustrated, insert sheet 88 is connected to the outer peripheral surface of hub portion 86 by being press-fitted thereon.

The supply and removal of cooling fluid to and from the hollow chamber 80 for circulation therein may be effected through suitable openings 44' in the inner leg or hub portion 44, FIGS. 2, 4 and 7, and through suitable openings 86' in the hub portion 86 in FIGS. 3, 5 and 6.

As mentioned heretofore with specific reference to FIG. 1, the apex grooves 30 are provided to receive the axis-parallel sealing strips or peripheral seals (not shown), and it will be evident that it is not always advisable to cut too deeply into the weld in the plane of division of the rotor since doing so may militate against the obtainment of the desired tightness at the bottom of the groove in the plane of division. As hereinbefore mentioned, the radial thickness of the welding seam 82 in the embodiment of FIGS. 2-5 inclusive is preferably made greater in the apex zones of the rotor than the depth of the groove. Thus, in the region of the plane of division the side walls and bottom of the grooves 30 are formed, in part at least, by the material of the welding seam. In certain cases, however, it may be desirable or necessary for the groove not to extend through, and be formed in part by material of, the welding seam. To this end, therefore, and with reference to the embodiments of the invention shown in FIGS. 6 and 7 and in FIG. 10, an apex or peripheral insert member 96 is provided between the peripheral portions 46 and 66 of the rotor at each of the apex edges 28, in the plane of division of the welding seam 82, each insert member being disposed radially, and being grooved axially, of the rotor, so as to form a part of the longitudinal apex groove 30. These peripheral insert members 96 are each preferably of cylindrical shape and form a close fit in the respective radially extending cylindrical bores 98 cut into the outer leg or peripheral portions 46 and 66 in the plane of division of the two basic rotor parts. These outer peripheral insert members 96 are securely and integrally connected to the surrounding peripheral portions 46 and 66, and to the reinforcing member 88 if employed, in a fluid-tight manner, by shielded brazing, welding, or other suitable joining method. In all other aspects the embodiments shown in FIGS. 6 and 7 correspond to the embodiments shown in FIGS. 3 and 4, respectively. It will be evident that FIGS. 6 and 7 may be advantageously modified in accordance with the embodiments shown in FIGS. 5 and 2, respectively, if desired.

As noted, particularly from FIGS. 6, 7 and 10, the bores 98 into which the peripheral insert members 96 are inserted, are made sufficiently deep radially in the plane of division that the insert member will extend below the bottom of the groove 30 and, preferably, into abutting relation to the reinforcing member 88, FIGS. 7 and 10, if the latter be employed. Through the use of the insert members 96, the apex grooves 30 thus penetrate the plane of division of the rotor without penetrating the material of the welding seam 82 in the plane of division. The insert members 96 are preferably made of steel although other suitable materials may be used. The peripheral surfaces 22, 24 and 36 are preferably provided with suitable peripheral recesses 94, one in each surface, so as to provide necessary combustion chamber volume in the use of the rotor in a rotary internal combustion engine. These recesses, as shown, are formed, as to each, part in the peripheral portion 46 and part in the peripheral portion 66 during the forging, molding, die-casting or other mode of fabrication of the basic rotor parts, so that upon assembly and joining together of these parts into a unitary structure, the complete recess will be formed in each peripheral surface.

It is obvious that a great many minor variations in details of design and of materials used in constructing rotors for rotary engines of the type aforesaid, could be embodied in the rotor without departing from the basic principles of the invention.

It may be pointed out that whenever in the foregoing reference was made to welding, welding seam and the like these expressions shall, for the purpose of this invention, also include brazing, brazing seam and the like as an alternative.

While there has been shown what is at present considered to be preferred embodiments of the invention, it is apparent that many changes and modifications may be made therein without departing from the invention, and it is, therefore, intended in the accompanying claims to cover all such changes and modifications as fall within the true spirit and scope of the invention.

What is claimed is:

1. A rotor for rotary engines comprising a first basic rotor part and a second basic rotor part, said parts being assembled together for rotation as a unit on a common rotational axis, said parts each having a peripheral portion extending parallel to said axis and in a direction opposite to the other peripheral portion from a plane of division perpendicular to said axis, and means joining said rotor parts together, with the opposing peripheral edges of said peripheral portions in adjoining relation to each other in said plane of division, said first and second parts when joined together forming a hollow rotor structure provided with apex edges in the peripheral surface formed by said peripheral surface portions, said rotor structure having grooves formed therein at said edges in a direction parallel to the axis of rotation of the rotor and penetrating said plane of division, and said joining means being a peripheral welding or brazing seam joining said opposing peripheral edges to each other along said plane of division, said seam having a greater radial extent at said apex edges than the depth of penetration of said grooves.

2. A rotor as claimed in claim 1, wherein said first and second rotor parts are identical, and including a hub portion, said first and second rotor parts being press-fitted along the outer surface portion of an inner portion thereof onto said hub portion.

3. A rotor as claimed in claim 2, including internal gear teeth on said hub portion.

4. A rotor as claimed in claim 1, wherein one of said parts includes an inner leg portion forming a hub portion of the rotor.

5. A rotor as claimed in claim 1, including a hub portion, and a reinforcing member provided in said plane of division, said reinforcing member extending between said hub portion and said peripheral portions being in abutting relationship with said hub portion, and in face to face relationship with the opposing peripheral edges of said peripheral portions at said junction, and being joined to said opposing edges by said seam.

6. A rotor as claimed in claim 1, wherein said apex edges are provided each with a bore extending in a direction perpendicular to the axis of rotation of the rotor, and including a peripheral insert member received within each of said bores and joined to said peripheral surface portions by said welding or brazing seam, said peripheral insert members each penetrating said plane of division, and said rotor edge grooves each extending through the associated peripheral insert member.

7. A method of making a hollow rotor for rotary engines comprising the steps of pre-forming a reinforcing insert member having a plurality of spaced openings, pre-forming two basic rotor parts to be assembled together with said insert member for rotation as a unit on a common rotational axis, said parts each having a peripheral portion to extend parallel to said axis in a direction opposite to the other peripheral portion from a plane of division perpendicular to said axis, assembling said parts and said reinforcing insert member into a unit in which the two peripheral portions are disposed at opposite sides of said insert member and said plane of division with a peripheral edge of one of said peripheral portions in opposing adjoining relation to a peripheral edge of the other in said plane of division, and integrally joining said peripheral edges and said insert member together along said plane of division, by welding.

8. A method according to claim 7, including the steps of forming a separate hub portion having internal gear teeth, and press-fitting the insert member onto the separate hub portion, press-fitting the two rotor parts to the hub portion, and integrally joining the two peripheral portions to opposite faces of the insert member, by welding, to provide a hollow partitioned chamber, the portions of which are in communication through the spaced openings.

9. A triangularly-shaped rotor for rotary engines having a peripheral surface provided with grooves at the apices of the rotor adapted to receive peripheral seals and having end faces provided with grooves adapted to receive end-face seals, to provide variable volume closed chambers between an outer body of the engine and the rotor, comprising first and second channelled rotor parts each having an end-face portion, an inner cylindrically shaped leg portion, and an outer arched triangularly-shaped leg portion, said leg portions paralleling the rotational axis of the rotor, and means integrally joining said inner leg portions together and said outer leg portions together to form a triangularly-shaped rotor having a hollow chamber between said end-face portions and said inner and outer leg portions, said joining means including a peripheral welding or brazing seam joining said outer leg portions together, said seam having a radial extent at the junction of the outer leg portions at each apex at least equal to the depth of penetration of the apex groove at said junction.

10. A rotor as claimed in claim 9, wherein each said end-face portion at spaced distances from the edges thereof is provided with grooves following the arched triangularly-shaped leg portions for the reception of the end-face seals, and said outer leg portions at the apices thereof are provided with grooves parallel to the rotational axis of said rotor, for the reception of the peripheral seals.

11. A rotor as claimed in claim 9, in which said rotor is provided with a bore at each apex of the rotor, at the junction of the outer leg portions at each apex, and including peripheral insert members positioned one in each bore, said insert members being bonded to said outer leg portions and each having an outer surface forming a continuous surface with the outer surface of said outer leg portions.

12. A rotor as claimed in claim 9, including an insert sheet having at least one opening therein, said insert sheet being connected to said first and second parts to divide said hollow chamber, and means joining said outer leg portions to said insert sheet adjacent to the junction of said outer leg portions, said opening providing communication between said first and second parts and interconnecting the two parts of said divided hollow chamber.

13. A rotor as claimed in claim 12, in which one of said inner leg portions is longer than the other of said inner leg portions, said outer leg portions each having the same length, said one leg portion forming the hub of said rotor and being provided with peripheral teeth on an outer surface thereof, said insert sheet being joined to said outer leg portions along the plane of division of said first and second parts and the other end of said insert sheet being joined to the inner surface of said one inner leg portion.

14. A rotor as claimed in claim 12, in which said first and second parts are identical, said inner leg portions being equal in length and said outer leg portions being equal in length, the length of said outer leg portions being greater than the length of said inner leg portions, and including a separate hub portion and an internally toothed ring gear formed at one end of said separate hub portion, said joining means joining one end of said insert sheet to said outer leg portions along the plane of division of said first and second parts, said other end of said insert sheet being press-fitted onto said hub portion, and said inner leg portions being press-fitted onto said hub portion.

15. A rotor as claimed in claim 11, in which said first and second parts are identical, said outer leg portion of each said parts being longer than said inner leg portion, and including a separate hub portion, said outer leg portions being joined along a plane of division perpendicular to the axis of said inner leg portions and said inner leg portions being press-fitted onto said hub portion.

16. A rotary member for engines having at least one rotary part and adapted to receive peripheral seals and end-face seals to provide closed chambers between a housing of the engine and the rotary member, the exterior of said rotary member having a pair of substantially parallel plane faces and three curved surfaces positioned between said pair of parallel plane faces to define three apex portions, each of said parallel plane faces having grooves for the reception of the end face seals, each of said apex portions having longitudinal grooves for the reception of the peripheral seals, said rotary member including first and second parts each having a base portion, an inner leg portion and an outer leg portion substantially parallel to the axis of rotation of the rotary member, and means integrally joining said inner leg portions and said outer leg portions together, respectively, to provide said rotary member with a hollow interior, said joining means including a peripheral welding or brazing seam joining said outer leg portions together, said seam having a radial extent at the junction of the outer leg portions at each apex at least equal to the depth of penetration of the apex groove at said junction.

References Cited in the file of this patent

UNITED STATES PATENTS

| 926,000 | Hallowell | June 22, 1909 |
| 1,617,863 | Planche | Feb. 15, 1927 |
| 1,686,569 | McMillan | Oct. 9, 1928 |
| 2,194,349 | Almdale | Mar. 19, 1940 |
| 2,803,500 | Black | Aug. 20, 1957 |

FOREIGN PATENTS

| 189,727 | Germany | Oct. 18, 1907 |
| 557,902 | Great Britain | Dec. 9, 1943 |
| 583,035 | Great Britain | Dec. 5, 1946 |